R. H. ZANDER.
MOTOR MOWING MACHINE.
APPLICATION FILED SEPT. 28, 1914.
1,335,266. Patented Mar. 30, 1920.
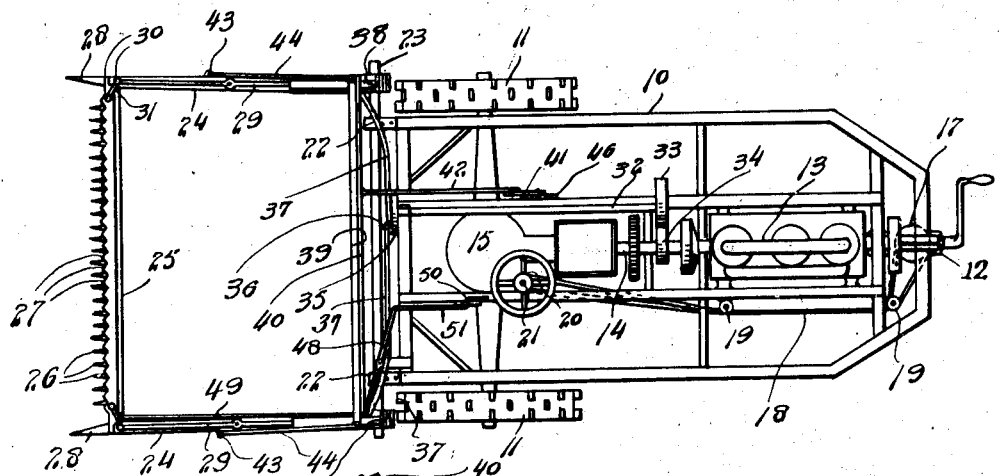
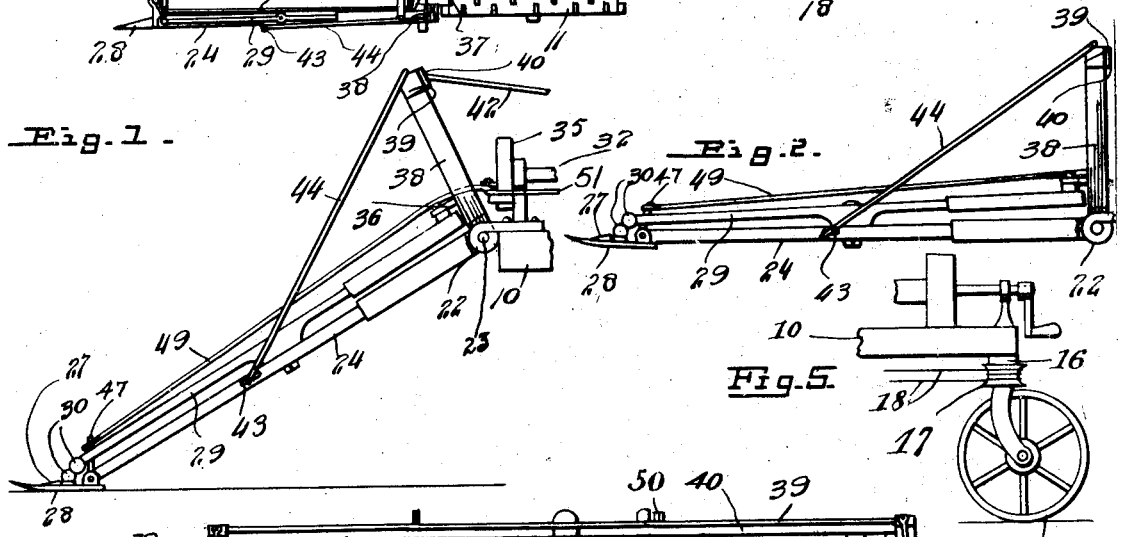
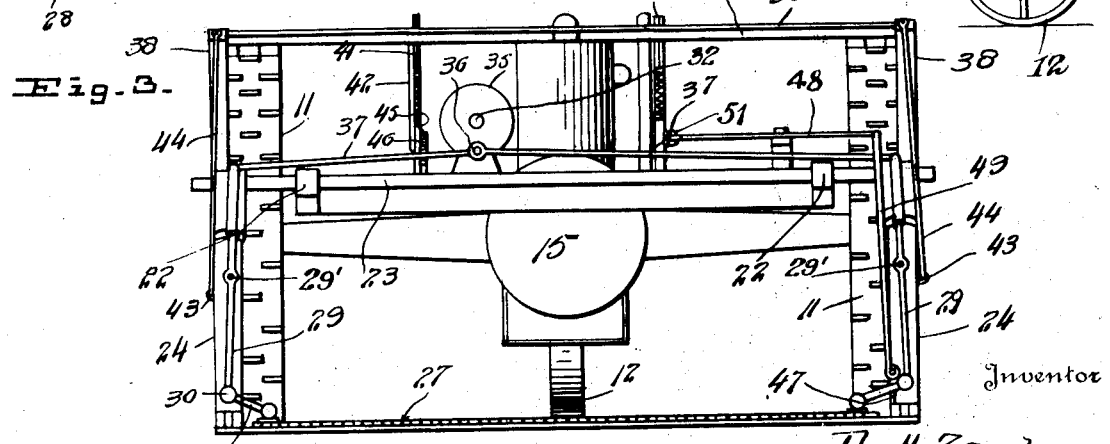
Witnesses
Inventor
R. H. Zander
Attorney

UNITED STATES PATENT OFFICE.

RICHARD H. ZANDER, OF ALMON, WISCONSIN.

MOTOR MOWING-MACHINE.

1,335,266.  Specification of Letters Patent.  Patented Mar. 30, 1920.

Application filed September 28, 1914. Serial No. 863,906.

*To all whom it may concern:*

Be it known that I, RICHARD H. ZANDER, a citizen of the United States, residing at town of Almon, in the county of Shawano, State of Wisconsin, have invented certain new and useful Improvements in Motor Mowing - Machines; and I do hereby declare the following to be a full, clear, and exact description of the invention, such as will enable others skilled in the art to which it appertains to make and use the same.

This invention relates to improvements in mowing machines, and particularly to motor operated mowing machines.

One object of the invention is to provide a machine of this character in which the cutting member can be adjusted to various heights so that the device can serve as a header as well as an ordinary mower.

Another object is to provide a machine of this character in which the cutter will maintain the proper horizontal position when the same is lifted.

Other objects and advantages of the invention will be apparent from the following description when taken in connection with the accompanying drawing.

In the drawing:

Figure 1 is a side elevation of a mowing machine partly broken away, made in accordance with my invention showing the cutting device in lowered position, Fig. 2 is a similar view showing the device in lifted position when used as a header, Fig. 3 is a front elevation, Fig. 4 is a top plan view, and Fig. 5 is a detailed side elevation of the rear portion of the frame showing the caster wheel.

Referring particularly to the accompanying drawing, 10 represents the chassis or main frame of the machine the forward portion of which is supported by the ground engaging wheels 11, while the rear of the frame is supported by a caster wheel 12. A motor 13 of explosive gas type is mounted in the rear part of the frame and drives the wheels 11 through the medium of the main drive shaft 14 and the gearing which is inclosed in the casing 15, this gearing being of the ordinary automobile type and not thought necessary of illustration. The spindle 16 of the caster wheel is provided with a wheel 17 around which passes a cable 18, this cable passing over the guiding pulleys 19 mounted on the frame and also around the pulley 20 in the forward portion of the frame, this latter pulley being turned by the usual automobile steering wheel 21. On the forward end of the main frame are secured the loop straps 22 in which is mounted a rock shaft 23 extending transversely of the frame. Near the ends of the shaft are secured forwardly extending parallel arms 24, the forward ends of which are connected by the transversely extending bar 25, the structure constituting a cutter frame. The transverse guard supports the guard fingers 26 and knife 27 as well as the divider fingers 28 of the cutter. Mounted on the arm 24 are levers 29 centrally pivoted at 29' and the forward ends of which are connected by means of ball and socket joints 30 to links 31 which are pivotally connected to the ends of the knife 27. Mounted on the frame 10, slightly to one side of the center thereof is a longitudinal shaft 32, the rear end of which is provided with a friction disk 33 which engages with a friction disk 34 carried by the shaft 14 and from which the shaft 32 receives power. On the forward end of the shaft 32 is a crank disk 35 which is provided with a wrist pin 36. Pivotally connected to this wrist pin are the inner ends of a pair of connecting rods 37, the outer ends of which are pivotally connected with the rear ends of the before mentioned levers 29. Thus as the crank disk 35 rotates, the connecting rods 37 will rock the levers 29 and reciprocate the cutter 27. At the rear ends of the arms 24 are short vertical standards 38 the upper ends of which are connected by means of a transverse bar 39. Secured at its opposite ends to the ends of the bar, and disposed to the rear of said bar, is a truss rod 40. Pivotally mounted on the frame 10 is a vertical hand operated lever 41 which is connected with the truss rod by means of a link 42. Connected to the upper ends of each of the standards and to eye members 43 carried by the arms 24 are links 44. When the lever 41 is moved rearwardly on its pivot the arms 24 will be raised, and by means of a segmental rack plate 46 and a pawl 45, the arms 24 can be held at various heights. Thus the cutter can be adjusted to cut the grain at any distance from the ground desired.

The mower knife and guard are pivotally mounted on the forward ends of the arms 24, one end of the guard being provided with a vertical stud 47 which is connected to one end of a centrally pivoted rock lever 48 by means of a link 49. Pivotally mounted on the frame 10 is a hand lever 50 connected to the other end of the rock lever 48 by a link 51. When the arms 24 of the cutter bar frame are swung upwardly on the pivot 23, and the lever 50 is held against movement, the link 49 will exert forward pressure against the stud 47 and thus rock the knife and guard on their pivots whereby the cutter bar will be automatically maintained in a horizontal position.

While I have shown two rocker arms 29 and two links 31, it will be understood that one may be used with equal effectiveness.

What is claimed is:

1. A combined mower and header comprising a wheeled frame, a frame pivoted at the forward portion of the first-named frame for vertical movement, a cutting mechanism mounted for vertical pivotal movement at the forward end of the second frame, standards at the rear portion of the second frame, means mounted upon the first frame and having connection with the standards for moving said second frame vertically to extend horizontally in alinement with the first frame or at a downward inclination, and means on the first frame and having connection with the cutting mechanism for positioning the latter horizontally irrespective of the position of the second frame.

2. In a motor driven mowing machine, a wheeled frame, drive wheels at the sides of the frame adjacent its forward portion, a motor on the frame having geared connection with the drive wheels, a drive shaft extending longitudinally of the wheeled frame and having operative connection with the motor shaft, a frame pivoted to the forward portion of the wheeled frame, a cutting mechanism pivoted to the forward end of the pivoted frame, a crank-disk at the forward end of said drive shaft, operative connections between the crank disk and the cutting mechanism for actuating the latter, means for normally maintaining the cutting mechanism horizontally positioned, and means for raising and lowering the pivoted frame.

3. A mowing machine comprising a motor driven frame, a frame pivoted to the forward portion of the motor frame for vertical swinging movement, a cutter bar mounted for pivoted movement at the forward end of the swinging frame and having a reciprocating knife, a standard at the rear portion of the swinging frame, braces between the standard and the swinging frame, an adjustable throw lever on the motor frame having connection with the upright to adjust the swinging frame vertically, a rock lever pivoted to one side of the swinging frame and having connection with the reciprocating knife of the cutter bar, a motor driven crank-disk having connection with the rear end of the lever for oscillating the latter from the motor frame, and an adjustable throw lever on the frame having pivoted connections with the cutter bar for maintaining the horizontal relation of the cutting mechanism thereof upon pivotal movement of the swinging frame vertically.

4. In a motor driven mowing machine and header, a motor driven frame, a swinging frame hinged to the forward end of said motor frame, a transversely disposed reciprocating cutter bar mounted on the forward end of the swinging frame, means upon the motor frame for raising and lowering the swinging frame, said cutter bar being pivotally mounted near its rear edge at the forward end of the swinging frame, an upright stud carried thereby, and a link connected with the motor driven frame and operatively connected to said stud whereby to automatically maintain the cutter bar in a horizontal position upon movement of the swinging frame.

In testimony whereof I affix my signature in the presence of two witnesses.

RICHARD H. ZANDER.

Witnesses:
 ANNA KLEBESADEL,
 EMIL J. BUETTNER.